United States Patent

Lesher

[15] 3,697,531

[45] Oct. 10, 1972

[54] N,N'-ALKYLENEBIS(PYRIDINE-CARBOXAMIDES)

[72] Inventor: George Y. Lesher, Schodack, N.Y.

[73] Assignee: Sterling Drug Inc., New York, N.Y.

[22] Filed: Feb. 25, 1971

[21] Appl. No.: 119,027

[52] U.S. Cl.......260/295 AM, 260/295.5 A, 424/263
[51] Int. Cl. ............................................C07d 31/44
[58] Field of Search..............260/295 AM, 295.5 A

[56] References Cited

FOREIGN PATENTS OR APPLICATIONS 533,436    12/1954    Belgium .............260/295 AM

*Primary Examiner*—Henry R. Jiles
*Assistant Examiner*—Robert T. Bond
*Attorney*—Elmer J. Lawson, B. Woodrow Wyatt, Thomas L. Johnson, Robert K. Bair, William G. Webb, Frederik W. Stonner, Theodore C. Miller, Roger T. Wolfe and Lynn T. Fletcher

[57] ABSTRACT

N,N'-Alkylenebis(alkoxypyridinecarboxamides) where alkylene has from seven to ten carbon atoms inclusive, having endocrinological properties, are prepared either by reacting an alkylenediamine with an alkoxypyridinecarboxylic acid or stepwise by reacting an alkylenediamine with an hydroxypyridinecarboxylic acid, halogenating the resulting N,N'-alkylenebis(hydroxypyridinecarboxamide) to form the corresponding N,N'-alkylenebis(halopyridinecarboxamide) and reacting said halopridinecarboxamide with a metal lower-alkoxide.

16 Claims, No Drawings

N,N'-ALKYLENEBIS(PYRIDINE-CARBOXAMIDES)

This invention relates to compositions of matter known in the art of chemistry as N,N'-alkylenebis(pyridinecarboxamides) and to their preparation.

The invention in its composition aspect resides in compounds having formula I

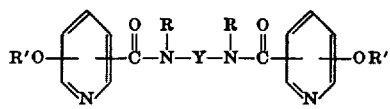

where R is hydrogen or lower-alkyl, R' is lower-alkyl and Y is alkylene having from seven to ten carbon atoms inclusive and having at least seven carbon atoms between its two connecting linkages. The compounds of this composition aspect of the invention when tested according to standard endocrinological evaluation procedures in female rats have been found to be useful in having antifertility activity.

"Lower-alkyl", as used herein, is an alkyl radical, preferably having from one to six carbon atoms, which can be arranged as straight or branched chains, including, for instance, but without limiting the generality of the foregoing, methyl, ethyl, n-propyl, isopropyl, 2-butyl, isobutyl and n-hexyl.

"Alkylene", as used herein, as designated by Y in formula I, is an alkylene radical having from seven to ten carbon atoms and having at least seven carbon atoms between its two connecting linkages, illustrated by

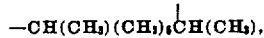

$-(CH_2)_7-$, $-(CH_2)_8-$, $-(CH_2)_9-$ and $-(CH_2)_{10}-$.

The invention sought to be patented in its process aspect is described as residing in the process for the preparation of the composition aspect of the invention, that is, the compound of formula I which comprises either reacting a diamine of the formula II

RNH—Y—NHR          II with at least two molar equivalents of a lower-alkoxypyridine-carboxylating agent or stepwise reacting a diamine of said formula II with at least two molar equivalents of an hydroxypyridinecarboxylating agent, halogenating the resulting N,N'-alkylenebishydroxypyridinecarboxamide) to form the corresponding N,N'-alkylenebis(halopyridinecarboxamide) and reacting said halopyridinecarboxamide with a metal lower-alkoxide.

Another aspect of the composition aspect of the invention resides in the intermediate N,N'-alkylenebis(hydroxy- or halo-pyridinecarboxamides of the formula III

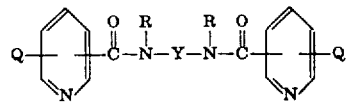

where Q is hydroxy or halo, R is hydrogen or lower-alkyl and Y is alkylene having from seven to ten carbon atoms inclusive and having at least seven carbon atoms between its two connecting linkages. Q when halo can be chloro, bromo, fluoro or iodo, preferably chloro.

The nature of the starting materials, mode of synthesis, results of elementary analyses, examination of the final products of formula I by infrared and nuclear magnetic resonance spectrographic analyses, all taken together, confirm the molecular structure assigned to these compounds.

The manner and process of making and using the invention will now be generally described so as to enable a person skilled in the art of medicinal chemistry to make and use the same, as follows.

The intermediate diamines and alkoxy- or hydroxy-pyridinecarboxylic acid are either commercially available or readily prepared using known starting materials and using conventional methods, as illustrated hereinbelow in the specific examples.

The compounds of formula I are useful in the free base form or in the form of their acid-addition salts, and both forms are within the purview of the invention, and are considered to be one and the same invention. The use of the salt form inherently amounts to use of the base form. The acids which can be used to prepared the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

The final products of formula I are prepared in one process aspect of the invention by reacting the appropriate diamine of formula II in one step with at least two molar equivalents of a (lower-alkoxy)pyridinecarboxylating agent, preferably a lower-alkoxypyridinecarboxylic acid. The reaction is carried out by mixing the reactants preferably in a suitable solvent, for example, dimethylformamide, tetrahydrofuran, benzene, ethylene dichloride, and the like, and either in the absence of or preferably in the presence of a dehydrating or an activating agent, e.g., dicyclohexylcarbodiimide, 1,1'-carbonyldiimidazole, and the like. The reaction is carried out preferably at room temperature, about 20–25° C. although higher temperatures up to about 100° C. can be used.

In another process aspect of the invention involving several steps the compounds of formula I are prepared by first reacting said diamine of formula II with at least two molar equivalents of an hydroxypyridinecarboxylating agent, preferably an hydroxypyridinecarboxylic acid, this first step being carried out like the above-described reaction of said diamine with a (lower-alkoxy)pyridinecarboxylating agent. The second step consists of halogenating the resulting N,N'-alkylenebis(hydroxypyridinecarboxamide); this halogenation is conveniently carried out using phosphorus pentachloride and phosphorus oxychloride, by first adding the phosphorus oxychloride to a chilled dry mixture of said alkylenebis(hydroxypyridinecarboxamide) and phosphorus pentachloride, next gently warming the reaction mixture with stirring and then heating the mixture with stirring on a steam bath. Alternatively, the halogenation can be run using phosphorus oxychloride or phosphorus oxybromide under pressure, or using triphenylphosphine dibromide or dichloride. In the third step the N,N'-alkylenebis(halopyridinecarboxamide) is reacted with an alkylating agent, preferably an alkali lower-alkoxide to form the N,N'-alkylenebis(alkoxypyridinecarboxamide); the reactants are preferably mixed cautiously in a suitable solvent, for example, tetrahydrofuran or a lower-alkanol (corresponding to the alkanol used to prepare the metal alkoxide), in an ice bath and the mixture is then gently heated on a steam bath under reflux with stirring.

The best mode contemplated for carrying out the invention will now be set forth as follows.

1. N,N'-Heptamethylenebis(5-methoxypicolinamide)

To a mixture containing 11.7 g. of 5-methoxypicolinic acid hydrochloride and 250 ml. of dimethylformamide was added 5.2 g. of sodium bicarbonate and the resulting mixture was stirred at room temperature for thirty minutes to provide a solution of 5-methoxypicolinic acid in free base form. To the stirred mixture was added 10.0 g. of 1,1'-carbonyldiimidazole and stirring was continued for 1 hour. Next, 4.0 g. of 1,7-heptanediamine was added and the resulting mixture was stirred at room temperature for 2 days. The reaction mixture was then poured into two volumes of water. The resulting crystalline precipitate was collected, washed successively with water and ether, recrystallized from isopropyl acetate and air-dried. This product was purified as follows: It was dissolved by warming it with 2N hydrochloric acid; the solution was cooled, washed twice with ether and made basic with solid sodium bicarbonate; the separated product was collected, washed with n-hexane, was slurried in dry ether, collected and dried overnight in a vacuum desiccator to yield 5.7 g. of N,N'-heptamethylenebis(5-methoxypicolinamide, m.p. 49–51° C. Reaction of this product with more than a two-fold excess of hydrogen chloride yields its dihydrochloride. Other acid-addition salts are similarly prepared by reaction with the appropriate acid.

The above intermediate 5-methoxypicolinic acid as its hydrochloride was prepared as follows. To a mixture containing 42.5 g. of 5-hydroxypicolinic acid and 1 liter of anhydrous benzene was added 74.5 g. of silver oxide and the resulting mixture was stirred for 30 minutes and then treated with 91.4 g. of methyl iodide. The resulting mixture was stirred for 16 hours at room temperature followed by refluxing on a steam bath for 24 hours with stirring. The reaction mixture was filtered to remove the silver oxide which was then washed with dry benzene. The filtrate was concentrated in vacuo to remove the benzene and excess methyl iodide. The residue, which crystallized on cooling, was treated with 330 ml. of 2N sodium hydroxide solution and the mixture heated on a steam bath overnight. The mixture was made acidic with concentrated hydrochloric acid and concentrated in vacuo to dryness. The residue was dissolved in boiling ethanol and filtered. The filtrate was treated with decolorizing charcoal and filtered. The filtrate was concentrated to dryness and the residue was slurried in isopropyl alcohol and the mixture filtered. The solid was washed successively with isopropyl alcohol and ether, and then air-dried to yield, as a white powder, 22.0 g. of 5-methoxypicolinic acid as its hydrochloride, m.p. 213–215° C.

Following the above procedure for the preparation of 5-methoxypicolinic acid using corresponding molar equivalent quantities of the appropriate hydroxypyridinecarboxylic acid, lower-alkyl halide (iodide, bromide or chloride), the following (lower-alkoxy)pyridinecarboxylic acids in the form of their hydrohalide salts are prepared: 5-methoxypicolinic acid, 5-ethoxypicolinic acid, 5-n-propoxypicolinic acid, 5-isopropoxypicolinic acid, 5-n-butoxypicolinic acid, 5-isobutoxypicolinic acid, 5-n-hexoxypicolinic acid, 3-methoxypicolinic acid, 2-methoxyisonicotinic acid, 3-ethoxyisonicotinic acid, 6-methoxynicotinic acid and 6-ethoxynicotinic acid.

2A. N,N'-Heptamethylenebis(6-hydroxynicotinamide)

To a stirred suspension containing 13.9 g. of 6-hydroxynicotinic acid in 500 ml. of dimethylformamide was added 16.2 g. of 1,1'-carbonyldiimidazole and the resulting mixture was stirred for 30 minutes at room temperature whereupon the 6-hydroxynicotinic acid dissolved to give a pale yellow solution. To the solution was added with stirring 6.5 g. of 1,7-heptanediamine and a small quantity of dimethylformamide whereupon a pale yellow gelatinous precipitate formed, most of which dissolved after stirring the mixture for about 1 hour, at which time a solid began to separate. The mixture was stirred at room temperature for 92 hours and the yellowish white solid was collected and taken up in 335 ml. of 2.5 percent potassium hydroxide solution. The alkaline solution was filtered through infusorial earth using a sintered glass funnel. The filtrate was acidified with 3N hydrochloric acid with stirring. The separated white solid was collected, washed with fresh water, air-dried, recrystallized from 175 ml. of acetic acid, washed with acetone and dried in a vacuum oven at 110° C. to yield 12.4 g. of N,N'-heptamethylenebis(6-hydroxynicotinamide), m.p. 272–273°C.

Following the procedure described in Example 2A for the preparation of N,N'-heptamethylenebis(6-hydroxynicotinamide) but using corresponding molar equivalent quantities of the appropriate hydroxypyridinecarboxylic acid in place of 6-hydroxynicotinic acid and the appropriate alkylenediamine in place of 1,7-heptanediamine, the following N,N'-alkylenebis(hydroxypyridinecarboxamides) are formed: N,N'-heptamethylenemN,N'-dimethylbis(6-hydroxynicotinamide), N,N'-heptamethylenebis(2-hydroxynicotinamide), N,N'-heptamethylenebis(4-hydroxynicotinamide), N,N'-heptamethylenebis(4-hydroxypicolinamide), N,N'-heptamethylenebis(5-hydroxypicolinamide), N,N'-hepta-methylene-N,N'-dimethylbis(5-hydroxypicolinamide), N,N'-heptamethylenebis(6-hydroxypicolinamide), N,N'-octamethylenebis(6-hydroxynicotinamide), N,N'-nonamethylenebis(6-hydroxynicotinamide), N,N'-decamethylenebis(6-hydroxynicotinamide), N,N'-heptamethylene-bis(2-hydroxyisonicotinamide) and N,N'-heptamethylenebis(3-hydroxyisonicotinamide).

2B. N,N'-Heptamethylenebis(6-chloronicotinamide)

To a dry mixture containing 18.6 g. of N,N'-heptamethylenebis(6-hydroxynicotinamide) and 37.0 g. phosphorus pentachloride and placed in an ice bath was added 22.0 g. of phosphorus oxychloride, and the flask containing the resulting mixture was shaken until the mixture was mixed as well as possible. The flask was then placed in a pan of warm water for about 15 minutes and was next heated gently on a steam bath with stirring overnight. The mixture was cooled and poured into 800 g. of crushed ice. The resulting mixture was stirred while allowing the ice to melt. The solid was collected, washed with fresh water, air-dried, recrystallized from 130 ml. of dimethylformamide using decolorizing charcoal, washed with acetone and dried in a vacuum oven to yield 14.8 g. of N,N'-heptamethylenebis(6-chloronicotinamide), m.p. 202-204° C.

Following the procedure described in Example 2B but using corresponding molar equivalent quantities of the appropriate N,N'-alkylenebis(hydroxypyridinecarboxamide) in place of N,N'-heptamethylenebis(6-hydroxynicotinamide), the following N,N'-alkylenebis(chloropyridinecarboxamides) are obtained: N,N'-heptamethylene-N,N'-dimethylbis(6-chloronicotinamide), N,N'-heptamethylenebis(2-chloronicotinamide), N,N'-heptamethylenebis(4-chloronicotinamide), N,N'-heptamethylene-bis(4-chloropicolinamide), N,N'-heptamethylenebis(5-chloropicolinamide), N,N'-heptamethylene-N,N'-dimethylbis(5-chloropicolinamide), N,N'-heptamethylenebis(6-chloropicolinamide), N,N'-octamethylenebis(6-chloronicotinamide), N,N'-nonamethylenebis(6-chloronicotinamide), N,N'-decamethylenebis(6-chloronicotinamide), N,N'-heptamethylenebis(2-chloroisonicotinamide) and N,N'-heptamethylenebis(3-chloroisonicotinamide). Following the procedure described in Example 2B but using triphenylphosphine dibromide as the halogenating agent, there is obtained N,N'-heptamethylenebis(6-bromonicotinamide).

2C. N,N'-Heptamethylenebis(6-methoxynicotinamide)

To 750 ml. of methanol chilled in an ice bath was cautiously added with stirring 30 g. of sodium methoxide. To this cooled solution was added with stirring 14.8 g. of N,N'-heptamethylenebis(6-chloronicotinamide). The resulting reaction mixture was gently heated on a steam bath and was then refluxed on the steam bath with stirring for 72 hours. The reaction mixture was allowed to cool to room temperature and then poured into 2,500 ml. of water. The resulting suspension was stirred for 3 hours and the white solid was collected, rinsed with a little fresh water, air-dried, recrystallized once from 650 ml. of acetonitrile, dried in a vacuum oven, recrystallized a second time from 350 ml. of acetonitrile and air-dried in a vacuum oven to yield 7.9 g. of N,N'-heptamethylenebis(6-methoxynicotinamide), m.p. 162.5–163° C. Reaction of this product with more than a two-fold excess of hydrogen chloride yields its dihydrochloride. Other acid-addition salts are similarly prepared by reaction with the appropriate acid.

Following the example described in Example 1 for the preparation of N,N'-heptamethylenebis(5-methoxypicolinamide) but using corresponding molar equivalent quantities of the appropriate alkoxypyridinecarboxylic acid in place of 5-methoxypicolinic acid and using the appropriate alkylenediamine in place of 1,7-heptanediamine, the N,N'-alkylenebis(alkoxypyridinecarboxamides) of Examples 3-17 are prepared.

3. N,N'-Heptamethylenebis(5-methoxynicotinamide).
4. N,N'-Octamethylenebis(5-methoxypicolinamide).
5. N,N'-Nonamethylenebis(5-methoxypicolinamide).
6. N,N'-Decamethylenebis(5-methoxypicolinamide).
7. N,N'-Heptamethylenebis(5-ethoxypicolinamide).
8. N,N'-Heptamethylenebis(5-n-propoxypicolinamide).
9. N,N'-Heptamethylenebis(5-isopropoxypicolinamide).
10. N,N'-Heptamethylenebis(5-n-butoxypicolinamide).
11. N,N'-Heptamethylenebis(5-isobutoxypicolinamide).
12. N,N'-Heptamethylenebis(5-n-hexoxypicolinamide).
13. N,N'-Heptamethylenebis(3-methoxypicolinamide).
14. N,N'-Heptamethylenebis(2-methoxyisonicotinamide).
15. N,N'-Heptamethylenebis(3-ethoxyisonicotinamide).
16. N,N'-Heptamethylene-N,N'-dimethylbis(5-methoxypicolinamide).
17. N,N'-Heptamethylene-N,N'-diethylbis(6-methoxynicotinamide).

Following the procedure described in Example 2C for the preparation of N,N'-heptamethylenebis(6-methoxynicotinamide) but using corresponding molar equivalent quantities of the appropriate N,N'-alkylenebis(chloropyridinecarboxamide) in place of N,N'-heptamethylenebis(6-chloronicotinamide) and using the appropriate alkali, e.g., sodium, alkoxide in place of sodium methoxide, the following N,N'-alkylenebis(alkoxypyridinecarboxamides) of Examples 18-34 are obtained.

18. N,N'-Heptamethylenebis(6-ethoxynicotinamide).
19. N,N'-Heptamethylenebis(6-n-propoxynicotinamide).
20. N,N'-Heptamethylenebis(6-n-butoxynicotinamide).

21. N,N'-Heptamethylenebis(6-isobutoxynicotinamide).
22. N,N'-Heptamethylenebis(6-n-hexoxynicotinamide).
23. N,N'-Octamethylenebis(6-methoxynicotinamide).
24. N,N'-Nonamethylenebis(6-methoxynicotinamide).
25. N,N'-Decamethylenebis(6-methoxynicotinamide).
26. N,N'-Heptamethylenebis(2-methoxynicotinamide).
27. N,N'-Heptamethylenebis(4-methoxynicotinamide).
28. N,N'-Heptamethylenebis(4-methoxypicolinamide).
29. N,N'-Heptamethylenebis(6-methoxypicolinamide).
30. N,N'-Heptamethylenebis(2-methoxyisonicotinamide).
31. N,N'-Heptamethylenebis(3-ethoxyisonicotinamide).
32. N,N'-Heptamethylene-N,N'-dimethylbis(6-methoxynicotinamide).
33. N,N'-Heptamethylene-N,N'-dimethylbis(5-methoxypicolinamide.
34. N,N'-Heptamethylenebis(5-methoxypicolinamide).

The antifertility activity of the compounds of the invention was determined by the following standard test procedure using female rats which are medicated prior to, during and after the mating period. The rats are autopsied on the 14th post mating day and the uteri are examined for evidence of pregnancy. The procedural details are as follows. A colony of sexually mature female rats of the Sprague-Dawley strain weighing 200–300 gms. are maintained on routine laboratory care. Daily vaginal smears are examined to record the cyclic characteristics of each rat. A given test is composed of rats which have exhibited a minimum of 3 coincidental estrus cycles. Three days prior to an expected estrus the rats to be placed on test are grouped, housed individually and placed on medication. The medication consists of a test compound, prepared as a solution or suspension in a suitable vehicle, administered orally via stomach tube once daily for a total of 8 medications in a 10 day period (Sunday medications are omitted). One group receives only the vehicle in a like manner to serve as a control. Late in the afternoon of the day preceding the expected estrus a mature proven fertile male is housed with each female overnight. The following morning all males are removed and a vaginal smear of each female is examined for the presence of spermatozoa as evidence that insemination has occurred. Medication of all inseminated rats is continued through the 7th post insemination day. The rats are autopsied 7 days after the last medication and the uteri removed and examined for evidence of pregnancy. The number of implantation sites, number of resorption sites, total number of fetuses and the number of viable fetuses are recorded. When tested by this procedure, the compounds of the invention were found to have antifertility at dose levels ranging from about 50 to 300 mg. per kg. per day.

The actual determination of the numerical antifertility data definitive for a particular compound is readily obtained by standard test procedures, referred to above, by technicians versed in endocrinological test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

I claim:

1. N,N'-Alkylenebis(alkoxypyridinecarboxamide) of the formula

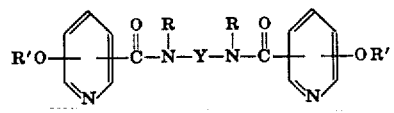

where R is hydrogen or lower-alkyl, R' is lower-alkyl and Y is alkylene having from seven to ten carbon atoms inclusive and having at least seven carbon atoms between its two connecting linkages.

2. N,N'-Alkylenebis[5-(lower-alkoxy)picolinamide] according to claim 1.

3. N,N'-Alkylenebis[6-(lower-alkoxy)nicotinamide] according to claim 1.

4. A compound according to claim 1 where, R is hydrogen, R' is methyl and Y is heptamethylene.

5. N,N'-Heptamethylenebis(5-methoxypicolinamide) according to claim 4.

6. N,N'-Heptamethylenebis(6-methoxynicotinamide) according to claim 4.

7. A process for the preparation of a compound according to claim 1 which comprises either reacting a diamine of the formula

RNH—Y—NHR with a lower-alkoxypyridinecarboxylating agent or reacting a diamine of said formula with an hydroxypyridinecarboxylating agent, halogenating the resulting N,N'-alkylenebis(hydroxypyridinecarboxamide) to form the corresponding N,N'-alkylenebis(halopyridinecarboxamide) and reacting said halopyridinecarboxamide with a metal lower-alkoxide.

8. A process according to claim 7 which comprises reacting 1,7-heptanediamine with 5-(lower-alkoxy)picolinic acid to form N,N'-heptamethylenebis[5-(lower-alkoxy)picolinamide].

9. A process according to claim 7 which comprises reacting 1,7-heptanediamine with 5-methoxypicolinic acid to form N,N'-heptamethylenebis(5-methoxypicolinamide).

10. A process according to claim 7 which comprises reacting 1,7-heptanediamine with 6-hydroxynicotinic acid to form N,N'-heptamethylenebis(6-hydroxynicotinamide), chlorinating said 6-hydroxynicotinamide to prepare the corresponding N,N'-heptamethylenebis(6-chloronicotinamide), and reacting said 6-chloronicotinamide with an alkali lower-alkoxide to form N,N'-heptamethylenebis[6-(lower-alkoxy)nicotinamide].

11. A process according to claim 7 which comprises reacting 1,7-heptanediamine with 6-hydroxynicotinic acid to form N,N'-heptamethylenebis(6-hydroxynicotinamide), chlorinating said 6-hydroxynicotinamide to prepare the corresponding N,N'-heptamethylenebis(6-chloronicotinamide) and reacting said 6-chloronicotinamide with an alkali methoxide to form N,N'-heptamethylenebis(6-methoxynicotinamide).

12. N,N'-Alkylenebis(hydroxy- or halo-pyridinecarboxamide) of the formula

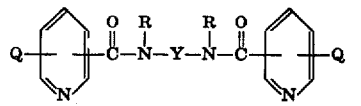

where Q is hydroxy or halo, R is hydrogen or lower-alkyl and Y is alkylene having from seven to ten carbon atoms inclusive and having at least seven carbon atoms between its two connecting linkages.

13. N,N'-Alkylenebis(5-hydroxypicolinamide) according to claim 12.

14. N,N'-Alkylenebis(5-halopicolinamide) according to claim 12.

15. N,N'-Alkylenebis(6-hydroxynicotinamide) according to claim 12.

16. N,N'-Alkylenebis(6-halonicotinamide) according to claim 12.

* * * * *